United States Patent [19]

Henderson

[11] 4,062,489
[45] Dec. 13, 1977

[54] SOLAR-GEOTHERMAL HEAT SYSTEM

[76] Inventor: Roland A. Henderson, Rte. 6, Box 201, Chippewa Falls, Wis. 54729

[21] Appl. No.: 678,765

[22] Filed: Apr. 21, 1976

[51] Int. Cl.² ............................................... F24D 0/00
[52] U.S. Cl. ........................................ 237/1 A; 62/2; 165/18
[58] Field of Search ..................... 237/1 A, 2 B; 62/2, 62/238, 260; 165/18; 126/400

[56] References Cited

U.S. PATENT DOCUMENTS

| 2,260,477 | 10/1941 | Newton | 165/18 |
|---|---|---|---|
| 2,690,649 | 10/1954 | Borgerd | 62/238 |
| 2,713,252 | 7/1955 | Jackson et al. | 165/18 |
| 3,563,304 | 2/1971 | McGrath | 237/2 B |
| 3,949,732 | 4/1976 | Reines | 237/1 A |
| 3,965,972 | 6/1976 | Petersen | 237/1 A |

Primary Examiner—William E. Wayner
Assistant Examiner—Robert J. Charvat
Attorney, Agent, or Firm—Dugger, Johnson & Westman

[57] ABSTRACT

A heating system that includes a solar collector assembly exterior of a building that is fluidly connected by inlet and return conduits to separate chambers in a heat transfer tank located in the building, a heat pump furnace unit having an evaporation-condensor coil located in the heat transfer tank so that as the liquid flows in the tank from one chamber to the other it flows in heat transfer relationship to the coil, the heat pump furnace unit being located outside of the tank and being provided for supplying heat to the building heating system, and a plurality of vertically elongated ground heat exchangers extended into the earth and connected by conduits so that there is provided a liquid flow path from one of the tank chambers through the ground heat exchangers, and then back to the other chamber. Pumps are provided in the above conduits for pumping the liquid between the tank and the solar collector assembly, and the tank and the ground heat exchangers.

3 Claims, 8 Drawing Figures

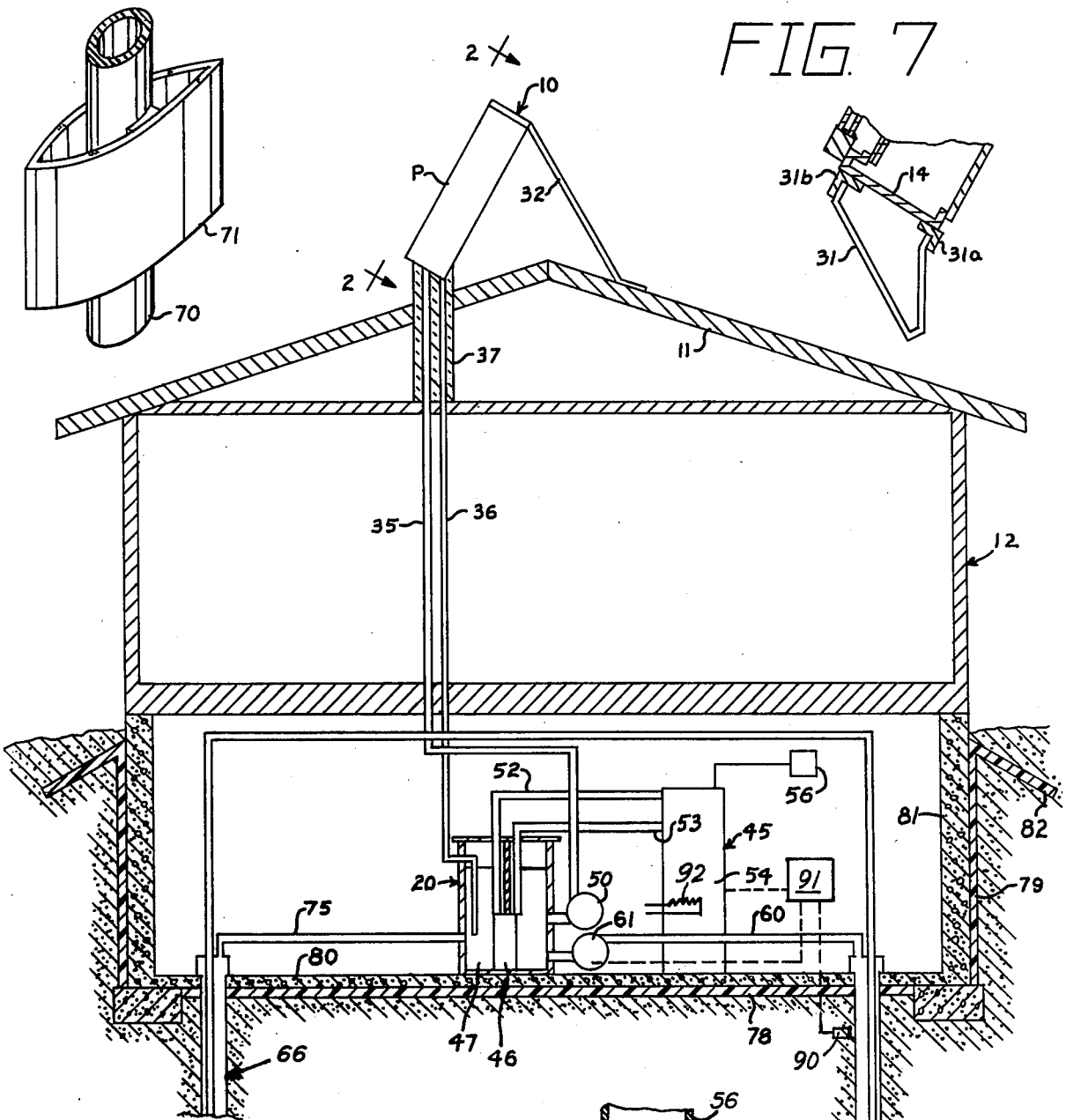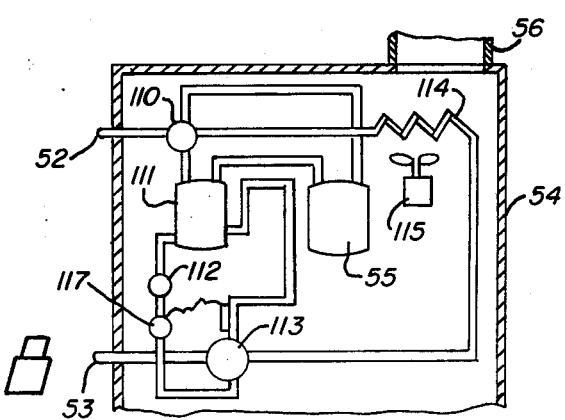

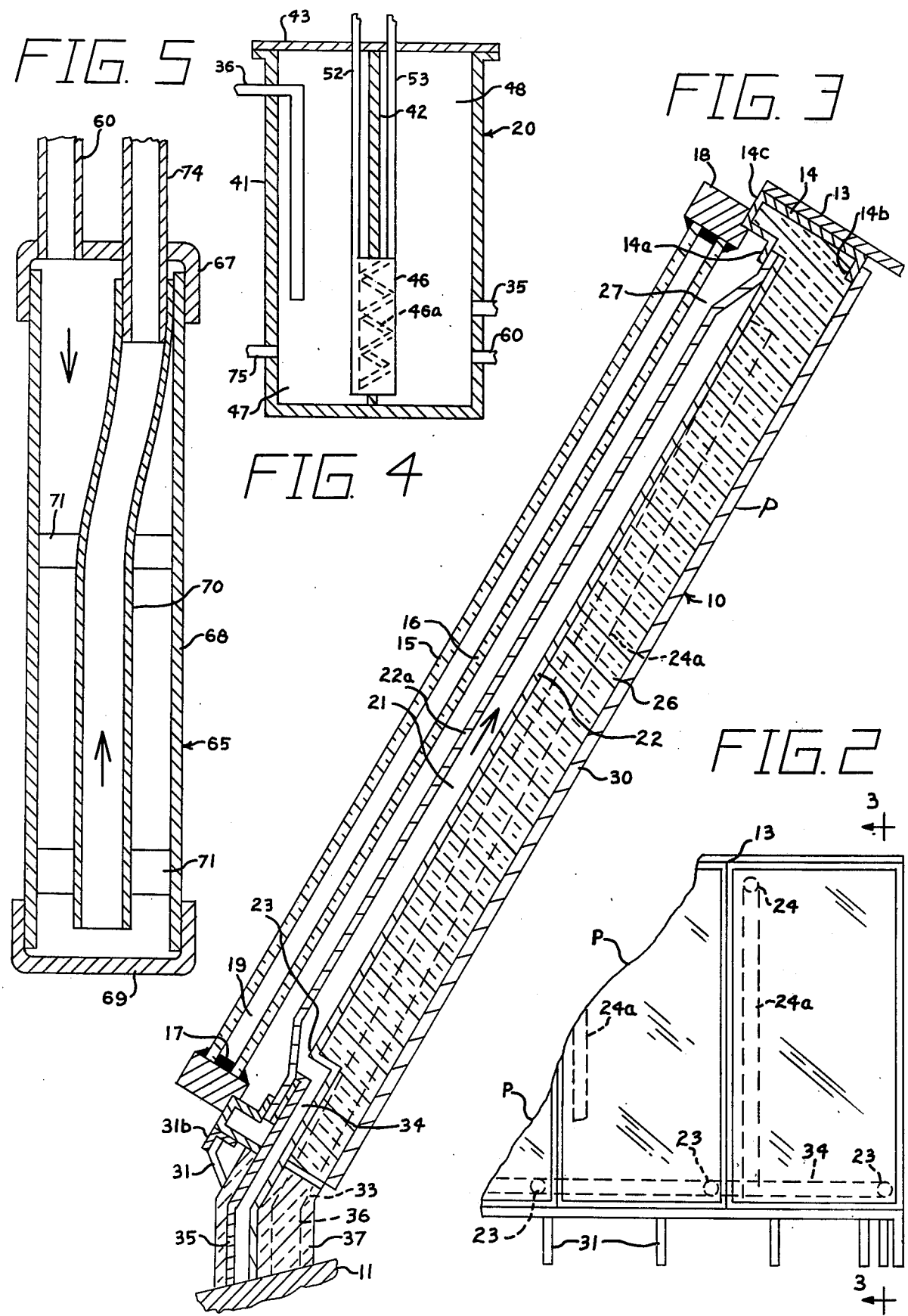

SOLAR-GEOTHERMAL HEAT SYSTEM

BACKGROUND OF THE INVENTION

A heating system for a building or the like.

In some prior art systems, for example such as disclosed in U.S. Pat. Nos. 2,559,869 and 3,254,702, there are provided large tanks of water or other liquid to store heat. Such tanks are large, cumbersome, and occupy valuable space in buildings that could be put to better use for other purposes. Other systems, for example, such as disclosed in U.S. Pat. No. 3,236,294 use rocks that must be transported and then stored in a special room of the building. For heating the building, such prior art systems require that the heat storing material be at a higher temperature than the temperature at the place of use. In order to obviate problems such as the above, as well as others, this invention has been made.

SUMMARY OF THE INVENTION

A heating system for a building or the like that includes a solar collector assembly for collecting solar energy, the solar collector assembly being in fluid communication with a transfer tank in the building for transferring heat thereto, a heat pump having an evaporator condenser coil in the tank for transferring heat from the tank to the heating system of the building, and a plurality of heat wells extended into the earth and connected by a liquid conduit system for transferring heat between the earth and the tank.

One of the objects of this invention is to provide a new and novel heating system that includes a solar heat collector assembly for storing heat in the earth. Another object of this invention is to provide a new and novel heating system that includes a solar collector assembly wherein the heat stored in the system is at a lower temperature than the temperature at the place of use. An additional object of this invention is to provide a new and novel heating system that is relatively inexpensive to install, avoids the use of expensive storage tanks in rooms for storing the heat, has a greatly increased heat storage capacity over existing systems, and that reduces the cost of installing a heat recovery system. Still another object of this invention is to provide a new and novel solar collector assembly.

BRIEF DESCRIPTION OF THE DRAWINGS

FIG. 1 is a generally vertical cross-sectional view of the solar-geothermal heating system of this invention, parts thereof being diagrammaticaly shown;

FIG. 2 is a view generally taken along the line and in the direction of the arrow 2—2 of FIG. 1 to illustrate a part of the solar collector assembly and the mounting thereof;

FIG. 3 is an enlarged cross-sectional view generally taken along the line and in the direction of the arrow 3—3 of FIG. 2 to more fully illustrate the construction of the solar collector assembly;

FIG. 4 is an enlarged cross-sectional view of the liquid transfer tank, said view showing the evaporator-condensor coil of the heat pump that is located therein;

FIG. 5 is an enlarged vertical cross-sectional view of one of the ground heat exchangers; and FIG. 6 is a fragmentary perspective view showing the mounting of a spacer on the inner tube of the ground heat exchanger; and FIG. 7 is a fragmentary view showing a roof bracket mounting a panel.

FIG. 8 is a schematic showing of part of the heat pump.

Referring now to FIG. 1, there is shown a solar collector assembly, generally designated 10, that is mounted on the roof 11 of a building, generally designated 12. The solar collector assembly includes a plurality of solar panels P, each panel including a generally rectangular perimetric frame 14 that is open at the front and back and has an in-turned back flange 14b for mounting a rear panel 30. Further, the frame 14 has a perimetric, in-turned flange 14a that is located a substantial distance forwardly of the flange 14b. Mounted by flange 14a are heat absorber members 22, 22a that are joined at their perimetric edges to form an enclosed liquid chamber 21 that is of a length and width many times greater than the spacing of the main body portion of said members from one another. The spacing between the main body portions may be about ⅛ to ¼ inch, there being provided a sufficient number of spacers joined to each of the main body portion to prevent substantial bowing thereof due to internal liquid pressure. Opening through the lower corner portion of the heat absorber member 22 into the chamber 21 is an inlet 23 while in the diagonally opposite corner portion of said member there is provided an outlet 24 that opens to one end of a return conduit 24a. Advantageously, the conduit 24a extends within the space between the back panel 30 and the heat absorber member 22; while the remainder of the last mentioned space is being filled with suitable insulation 26, for example fiberglass, to minimize heat loss from the rear of the panel.

A generally rectangular perimetric bracket 18 is mounted on a perimetric flange 14c of frame 14 that is remote from flanges 14a, 14b, bracket 18 in conjunction with a suitable sealant 17 mounting a pair of glass panes 15 and 16 in parallel relationship to provide a dead air chamber 19 therebetween. Further, pane 16 in conjunction with frame 14 and heat absorber member 22a provide a dead air chamber 27 that is on the opposite side of the pane 16 from chamber 19.

Angle brackets 31a, 31b are mounted on the lower wall of frame 14, brackets 31a, 31b in turn being mounted by roof anchor brackets 31 that are suitably secured to the roof. The solar panels also may be bolted to one another at adjacent sides. The panels may be mounted with any one side being the lower side and one of the inlet and outlet openings 23, 24 will be at the lower side. The conduit 24a would be fluidly connected to the one of the openings 23, 24 that was in the upper corner while the manifold 34 would be fluidly connected to the opening in the lower corner. Advantageously, the overall dimensions of each solar panel will have the relationship of a length that is twice its width so that the solar panels may be connected to each other in horizontal relationship such as illustrated or in a vertical position with one being above another. This permits flexibility of installation at the job site.

A top frame member 13 is fixedly secured to the top sides of the panels, while one or more braces 32 have their one ends attached to frame member 13 and their opposite ends secured to the roof. With the above mentioned structure, the solar panels can be roof mounted, or mounted on the ground, to face south and still be angled to catch the sun rays at the most advantageous angle. Further, if the panels are roof mounted, the brackets 31 support the panels at a sufficient height above the roof to prevent forming a dam that would hold snow, rain or leaves on the roof. As a result, the mounting angle between the center line of the roof and the solar panels is not important other than the panels should be mounted so that the inlets are located in the lowermost or the lower corner of the panels.

Assuming the panels are mounted as shown in FIG. 2, panel inlets 23 are suitably fluidly connected to an inlet manifold 34 which in turn is fluidly connected to conduit 35. Similarly, the outlets 24 of the panels are connected by conduits 24a to an outlet manifold 33 which in turn is fluidly connected to the return conduit 36. Suitable insulation 37 is provided on the manifolds and conduits where the conduits extend through the roof and the attic space to prevent freezing of liquid thereon. Conduit 36 extends into the interior of the heat transfer tank 20 that is located, for example, in the basement of the home. The part of the conduit 36 in the tank may be perforated to facilitate self-draining of the solar panels when the pump 50 is not operating. The tank has a partition 42 that in combination with the evaporator condensor unit 46 of the heat pump, generally designated 45, divides the tank into two chambers, chambers 47 and 48. Liquid in the tank can flow from one chamber to the other through the unit 46 to contact the outer surface of the core 46a of the unit. Conduit 36 opens to chamber 47 while the conduit 35 opens to chamber 48 at an elevation intermediate the top wall 43 and the bottom wall of the heat transfer tank 20. A centrifugal pump 50 is provided in conduit 35.

The heat pump except as indicated below is of a conventional construction that has a capability of auxiliary heating in case the heat source of the heat pump is not adequate. The modification to the heat pump made by this invention is the installing the evaporator condenser unit in the heat transfer tank. The heat pump furnace unit 54 is in fluid communication (or heat transfer relationship) with the conventional heating system 56 of the building, for example, a hot air heating system. The heat pump is of a type that it can be used for cooling the building by reversing its cycle. That is, if the building is to be cooled, the heat system 56 transfers heat to the pump, the coil 46a transferring heat to the liquid in the tank 20. The heat pump includes a heat pump compressor 55 and a furnace unit exterior of the tank. As schematically shown in FIG. 8, the heat pump includes a reversing valve 110, an accumulator heat exchanger 111, a subcooling control valve 117, a filter drier 112, a manifold check valve 113 and a coil 114 in a circuit. A blower 115 is provided for blowing air through the coil 114 that is supplied to the heating system 56. Conduits 52, 53 fluidly connect the core 46a to the reversing valve 110 and the manifold 113 respectively.

To store heat energy, there are provided a plurality of ground heat exchangers, generally designated 65 and 66. Each of the ground heat exchangers includes a vertically elongated outer metal pipe 68 that is extended a substantial distance into the ground beneath the basement floor 80 of the building, provided the apparatus of this invention is used in a building with a basement. The lower end of the pipe 68 has a cap 69 secured thereto while a cap 67 is secured to the upper end of the pipe 68. An inner pipe 70 is mounted within pipe 68 by spacers 71 such that the lower end thereof is adjacent but spaced a short distance above the lower end of pipe 68. Pipe 70 is of a substantialy smaller outer diameter than the inner diameter of pipe 68 whereby there is provided an annular space between the pipes that extends for at least a major part of the length of the pipes.

A conduit 60 at one end opens to the lower portion of chamber 48 and at the opposite end through cap 67 of the ground heat exchanger 65 to discharge into the space between pipes 68 and 70. A centrifugal pump 61 is provided in conduit 60. A conduit 74 has one end portion thereof extended through the cap 67 of the heat exchanger 65 to be fluidly connected to the upper end of pipe 70 of exchanger 65, the opposite end of the conduit 74 being fluidly connected to the upper end of the inner pipe 70 of the heat exchanger 66. A conduit 75 opens through the cap 67 of heat exchanger 66 to be in fluid communication with the space between the pipes 68, 70 of said heat exchange, the opposite end of the conduit 75 opening into the lower portion of the chamber 47.

When the pump 61 is operating, liquid is withdrawn from chamber 48 and passed through the space between pipes 68, 70 of the ground heat exchanger 65 down to the lower end of pipe 70, and thence upwardly through pipe 70 and through conduit 74 to pass through the pipe 70 of the exchanger 66 to the lower end thereof. Then the liquid moves upwardly in pipe 68 between pipes 68, 70 of the heat exchanger 66 and through conduit 75 to chamber 47. If the temperature of the liquid passing in contact with the inner surfaces of pipe 68 is greater than the temperature of the ground surrounding said pipes, then heat is transferred from the liquid to the ground. On the other hand, if the temperature of the liquid is cooler than the ground temperature, then heat energy is transferred to the liquid. Even though there are only two ground heat exchangers illustrated, additional ground heat exchangers may be provided. Further, even though the ground heat exchangers are disclosed as being connected in series with the liquid tank, it is to be understood that such exchanges may be connected in parallel. The length of the ground heat exchangers and the number thereof would be determined by the heating and storage requirements of the building.

Because of the low and varying temperatures of the heat storage system, it is advisable to insulate the building floor from the earth. This can be done by installing styrofoam or other insulation 78 under the floor 80 at the time of construction, or in existing buildings, the insulation can be laid on the floor and covered with plywood and a finished flooring. Further, insulation 79 should be provided adjacent the side walls 81. Additionally, it is advisable that an insulation barrier 82 be provided to abut against the side walls of the building and extend outwardly therefrom around its perimeter just under the ground level to held hold in the ground heat and protect the side walls.

Assuming that the apparatus of this invention is being used for heating a building and the system 56 demands heat, the heat pump 45 is actuated and the liquid flowing through the coil 46a removes heat from the heat transfer tank 20. If the temperature of the liquid in the tank falls below the level for supplying heat to the coil, the pump 61 is automatically actuated whereby heat from the ground is transferred through the ground heat exchanger 65, 66 to the liquid flowing therethrough. Desirably a temperature sensor 90 is buried in the ground adjacent the ground heat exchanger and operatively connected to suitable controls 91 for the pump 61 and the heat pump to prevent operation of the pump 61 circulating liquid through the ground heat exchanger to withdraw heat from the ground when the ground temperature drops to just above freezing. The purpose of doing this is to prevent the ground becoming excessively cooled whereby ground heaving may take place which could result in damage to the building foundation.

When the system is being used for cooling a building, the heat from the system 56 is transferred to the heat pump and thence through the coil unit 46 to the liquid in the tank 20. With the pump 61 operating, and the temperature of the liquid being conducted to the ground heat exchangers being greater than the ground temperature immediately surrounding said exchangers, heat will be transferred from the ground heat exchangers to the earth as the liquid is circulated through said heat exchangers. In southern climates, the combination of the ground heat exchangers, the heat pump and the means for circulating liquid therethrough normally would be adequate to heat and cool buildings without additional heating, except for possible brief periods when additional auxiliary heat may be supplied by auxiliary heaters 92 in the heat pump. In northern climates, for example, such as in northern Wisconsin, where the heating requirements are severe, the normal ground temperature is approximately 45° F., and the frost line can go down to 8 feet; the quantity of heat removed from the earth adjacent the ground heat exchangers can be greater than the rate of flow of heat through the earth more remote from the ground exchangers to the area of the earth adjacent the exchangers 65, 66, especially if no heat is transferred by the ground heat exchangers to the ground for a prolonged period of time. Thus, additional heat has to be provided.

During the heating season when the temperature of the liquid in tank 20 is sufficiently below that in the liquid chamber 21 that if liquid was pumped from the tank and passed through the solar panels and back to the tank, the temperature of the liquid in the tank would be increased, through the use of appropriate temperature sensors and temperature controls (not shown), pump 50 would be automatically actuated to circulate liquid through the solar panels. At the same time, the pump 61 would be operated to transfer heat to the earth through the heat exchangers, provided the temperature of the liquid in the tank is sufficiently above the ground adjacent the ground heat exchangers. Accordingly, heat will be stored in the ground for additional use. In the event that the heat pump system is requiring heat, through automatic controls (not shown) the pump 61 may be shut off at the time that heat is being provided to the tank 20 from the solar heater and heat is being removed from the tank by the heat pump.

During the normal heating season when the temperature in the solar panels drops sufficiently that it would act to cool the liquid passing therethrough, the pump 50 would be automatically turned off; and the pump 61 would continue operating until the liquid passing through the ground heat exchangers dropped to the level below that of the ground closely adjacent the exchangers. However, if the temperature of the liquid in the tank drops sufficiently low that sufficient heat wasn't supplied to the coils 46 to permit the heat pump delivering adequate heat to system 56, the pump 61 would be operated so that heat was removed from the earth.

Preferably the solar panels are mounted such that the liquid therein will drain back into the heat transfer tank whenever the centrifugal pump 50 is not operating. With the apparatus of this invention, the heat stored may be at a lower temperature than that required at a point of use. As a result, neither the solar panels nor the ground heat exchangers have to be heated to as high a temperature as that required with conventional solar heating apparatus wherein no heat pump is provided, and as a result, the efficiency of the solar panel heating and the heat transfer of the ground heat exchangers is increased. That is, the temperature of the ground surrounding the ground heat exchangers and the temperature of the liquid in the tank may be below the levels of human comfort levels. Additionally, the tank may be relatively small since it is not provided to mainly store heat energy but rather to facilitate the transfer of heat between the liquid in the tank and the condenser unit, the solar collector and the ground heat exchanger serving to collect heat energy, and the ground surrounding the heat exchangers serving to store heat energy.

What is claimed is:

1. For a building having a heat circulation system, heat transfer apparatus comprising a tank, a heat pump for being connected in heat exchange relationship with the heat circulation system, said heat pump having a furnace unit exterior of the tank for transferring heat to the heat circulation system and an evaporator-condensor unit mounted in the tank in heat exchange relationship with the fluid in the tank, the condensor unit having a heat transfer coil in the tank, a vertically elongated ground heat exchanger for having fluid circulated therethrough, fluid conducting means including a pump for conducting fluid between the ground heat exchanger and the tank and opening to the tank, a solar heat collector for having fluid circulated therethrough, said collector having a fluid inlet and a fluid outlet, first conduit means for conducting fluid between said tank and collector inlet, second conduit means for conducting fluid between said tank and collector outlet, each of the conduit means opening to the tank and means connected in one of said conduit means for pumping fluid therethrough, and a partition in the tank that in cooperation with the condensor unit divides the tank into a first fluid chamber and a second fluid chamber, said condensor unit providing a fluid flow path between said chambers and having said coil extending into said flow path, the first conduit means opening to the first chamber, the second conduit means opening to the second chamber, and the fluid conducting means for conducting fluid between the ground heat exchanger and the tank including conduit means for conducting fluid between the ground heat exchanger and the first chamber, conduit means for conducting fluid between the ground heat exchanger and the second chamber and pump means in one of the two last mentioned conduit means for pumping fluid therethrough.

2. For a building having a heat circulation system, heat transfer apparatus comprising a tank, a heat pump for being connected in heat exchange relationship with the heat circulation system, said heat pump having an evaporator-condensor unit mounted in the tank in heat exchange relationship with the fluid in the tank, the condensor unit having a heat transfer coil, a vertically elongated ground heat exchanger for having fluid circulated therethrough, and fluid conducting means for conducting fluid between the ground heat exchanger and the tank, and a partition in the tank that in cooperation with the condensor unit divides the tank into a first fluid chamber and a second fluid chamber, said condensor unit providing a fluid flow path between said chambers and having said coil extending into said flow path and said ground heat exchanger including a vertically elongated outer tube having an upper end and a lower end, and a vertically elongated inner tube mounted in the outer tube to provide a fluid passageway between the tubes that is of a cross-sectional area greater than the transverse cross-sectional area of the inner tube, said inner tube having an upper end portion adjacent the outer tube upper end, and a lower end adjacent and terminating at an elevation higher than that of the outer tube lower end, and the fluid conducting means including a first conduit opening to the first chamber for placing the first chamber in fluid communication with the inner tube upper end, a second conduit opening to the second chamber for placing the second chamber in fluid communication with the fluid passage space between the tubes at a location adjacent the outer tube upper end, and a pump in one of said conduits for pumping fluid therethrough.

3. The apparatus of claim 2 further characterized in that there is provided a solar heat collector for having a fluid circulated therethrough, said collector having a fluid inlet opening to the first chamber and a fluid outlet, opening to the second chamber, first conduit means for conducting fluid between said tank and collector inlet, second conduit means for conducting fluid between said tank and collector outlet, and means connected in one of said conduit means for pumping fluid therethrough.

* * * * *